_United States Patent_ [19]

Shiba et al.

[11] Patent Number: 4,864,450
[45] Date of Patent: Sep. 5, 1989

[54] PROTECTIVE COVER FOR A MAGNETIC TAPE CASSETTE

[75] Inventors: Haruo Shiba; Kimio Tanaka; Takateru Satoh, all of Nagano, Japan

[73] Assignee: TDK Corporation, Japan

[21] Appl. No.: 296,814

[22] Filed: Jan. 12, 1989

Related U.S. Application Data

[63] Continuation of Ser. No. 863,058, May 14, 1986, abandoned.

[30] Foreign Application Priority Data

May 15, 1985 [JP] Japan .................................. 60-71661

[51] Int. Cl.⁴ ............................................ G11B 23/02
[52] U.S. Cl. .................................................... 360/132
[58] Field of Search ............... 360/132; 242/197–199; 206/387, 389; 215/355, 224, 201

[56] References Cited

U.S. PATENT DOCUMENTS

| 3,830,393 | 8/1974 | Schaefer | 215/224 X |
| 4,235,395 | 11/1980 | Wardenaar et al. | 242/199 |
| 4,519,521 | 5/1985 | Yoshii | 360/132 X |
| 4,646,189 | 2/1987 | Sasaki et al. | 362/132 |
| 4,740,856 | 4/1988 | Yoshii et al. | 360/132 |

FOREIGN PATENT DOCUMENTS

| 60-127586 | 7/1985 | Japan | 360/132 |
| 60-145583 | 8/1985 | Japan | 360/132 |
| 60-157783 | 8/1985 | Japan | 360/132 |
| 60-231987 | 11/1985 | Japan | 360/132 |

Primary Examiner—John H. Wolff
Attorney, Agent, or Firm—Steinberg & Raskin

[57] ABSTRACT

A magnetic tape cassette includes a protective cover pivotally mounted to the front side of a housing wherein the upper and lower front edge corner portions of an elongated main portion of the protective cover is formed with smooth surfaces to prevent the cover from inadvertently pivoting or opening during handling to expose the magnetic tape to contaminants.

4 Claims, 3 Drawing Sheets

PROTECTIVE COVER FOR A MAGNETIC TAPE CASSETTE

This is a continuation of application Ser. No. 863,058, filed 5/14/86 now abandoned.

BACKGROUND OF THE INVENTION

The present invention relates generally to magnetic tape cassettes of the type used for electromagnetically recording digital signals on magnetic tape and, more particularly, to an improved protective cover resiliently mounted to a front side of the tape cassette for covering a tape access opening at the front side of the cassette for protecting the magnetic tape from contaminants which may enter the tape cassette and compromise tape performance.

Magnetic tape cassettes designed mainly for the recording of analog signals onto magnetic tape are well known. Such tape cassettes are inserted into conventional recording/playback apparatus, such as a cassette tape recorder having a magnetic head which reads the analog signals and converts the same into sound and/or video output signals. On the other hand, floppy discs have been used for recording digital signals. The floppy discs are contained within housings provided with openings by which the floppy discs are accessed by the magnetic head.

However, problems exist in the use of floppy discs. For example, since a shutter which covers the access opening of the floppy disc housing when it is not in use does not possess a locking mechanism, an operator may inadvertently touch the magnetic surface of the floppy disc due to carelessness or inexperience or even may touch the magnetic surface intentionally, thereby leaving fingerprints on the recording surface. The fingerprints may have oil, grease and water deposits which will damage the disc. Moreover, dust, dirt or other contaminants may reach the magnetic surface of the floppy disc through the access opening which will also cause serious problems. It is also well known that the highly flexible nature of the floppy disc requires the operator to handle the same with utmost care.

In an attempt to resolve the problems inherent in the recording and playback of digital signals, a magnetic tape cassette has been proposed for recording digital signals on magnetic tape. The cassette generally comprises a rectangular housing having a tape access opening in its front wall. A pair of reels are rotatably mounted in the housing on which magnetic tape is wound for travel from one reel to the other. The tape is guided in its travel past the access opening in the cassette housing during recording and playback. The cassette also includes a protective cover which covers the run of magnetic tape exposed at the access opening in the front side of the housing when the cassette is not in use to prevent contaminants from entering the opening and adhering to the magnetic tape. The cover is pivotally mounted to the cassette housing for movement between the above-described tape-covering position to an in-use position wherein the cover is pivoted about 90° from its tape-covering position when the cassette is inserted into a slot of the cassette recording/playback apparatus.

Stop projections extend forwardly from the top and bottom walls of the cassette housing between which the protective cover is situated when in its tape-covering position to prevent the cover from inadvertently pivoting to its in-use position when the cassette is not in use.

However, the conventional construction of the cassette described above has the drawback that the front portion of the protective cover, which has a rectangular cross-section, normally projects forwardly beyond the end surfaces of the forwardly extending stop projections when the cover is in the tape-covering position and inadvertent engagement of the exposed top or bottom surface of the front portion of the cover during handling can cause undesired pivoting of the cover to its in-use position to expose the magnetic tape to contaminants.

SUMMARY OF THE INVENTION

Accordingly, it is an object of the present invention to provide a new and improved magnetic tape cassette which eliminates the above-described drawbacks and which reliably prevents undesired pivoting of the protective cover to its in-use position in which the magnetic tape is exposed when the cassette is not in use.

Another object of the present invention is to provide a new and improved magnetic tape cassette which reliably prevents undesired pivoting of the protective cover due to careless handling of the cassette.

Briefly, in accordance with the present invention, these and other objects are attained by providing a tape cassette including a housing having wall portions which define a front side having a tape access opening and an interior, means for mounting magnetic tape in the interior of the housing for travel past the access opening at the front side of the housing, a protective cover pivotally mounted to the front side of the housing for movement between a first tape-covering position in which the cover overlies the front side of the housing to protect the magnetic tape, and a second in-use or exposed position in which the cover is positioned remotely from the front side of the housing to expose the magnetic tape, and biasing means arranged in the housing in resilient engagement with the protective cover for biasing the protective cover towards the first, tape-covering and second, in-use positions. The protective cover comprises an elongated main portion which extends along the front side of the housing and a pair of arm portions which are connected to the opposite ends of the elongated main portion and which extend perpendicularly therefrom. In accordance with the invention, smooth surfaces are formed on the main portion of the protective cover in order to prevent the cover from pivoting from the first, tape-covering position to the second, in-use position when a force is applied to the main portion against the biasing means during handling.

In a preferred embodiment of the invention, the housing comprises upper and lower casings having respective upper and lower stop projections extending forwardly from their front side portions, and the elongated main portion of the cover is situated between the upper and lower front stop projections.

In another preferred embodiment, the elongated main portion of the protective cover has a thickness such that its front end portion projects forwardly beyond the front ends of the stop projections of the upper and lower housing casings when the cover is positioned in the first, tape-covering position. The smooth surfaces are formed in the upper and lower portions of the front end face of the main portion adjacent to the upper and lower faces thereof when the cover is positioned in the tape-covering position.

In still another preferred embodiment, the smooth surfaces are formed in the upper and lower edge portions at which the front face of the main portion intersects the upper and lower faces thereof.

DESCRIPTION OF THE DRAWINGS

A more complete appreciation of the present invention and many of the attendant advantages thereof will be readily understood by reference to the following detailed description when considered in connection with the accompanying drawings in which.

DETAILED DESCRIPTION OF THE PREFERRED EMBODIMENTS

Figure 1:
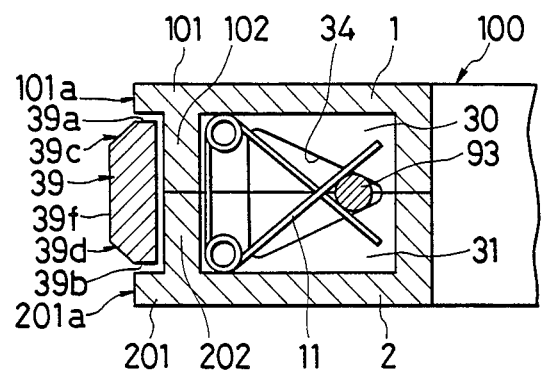
FIG. 1 is a fragmentary longitudinal sectional view of a front side of one embodiment of a magnetic tape cassette in accordance with the present invention.

Referring now to the drawings wherein like reference characters designate identical or corresponding parts throughout the several views, a conventional prior art magnetic tape cassette will be described with reference to FIGS. 4–7. The cassette housing comprises an upper rectangular casing 1 and a lower rectangular casing 2 molded of appropriate synthetic resin material. The upper and lower casings 1 and 2 are joined together to form the cassette housing 100 which has an access opening 10 at its front side. Magnetic tape 3 is mounted in the interior of the housing 100 for travel between a pair of rotatably mounted reels 4 and 5. In particular, the magnetic tape 3 is wound around reel 4 and is advanced over guide roller 6, a tape pad 7, a subsequent guide roller 8 and then onto the other reel 5 in a conventional manner. The tape 3 is advanced in a taut condition past the access opening 10 at the front side of the cassette housing 100 during recording/playback operations.

The cassette housing 100 is provided with a protective cover 9 for covering the run of the magnetic tape 3 which is exposed at the access opening 10 at the front side of the cassette housing 100. The cover 9 is pivotally mounted on the housing 100 for movement between a first closed or tape-covering position (FIGS. 4, 6 and 7) in which the cover 9 overlies the tape 3 at the front side of the housing and a second open or in-use position (FIG. 5) wherein the cover 9 is pivoted over about a 90° angle from the first position to a position remote from the tape 3 to provide access thereto for the recording/playback heads. In the first closed position, the protective cover 9 prevents dust, dirt and other contaminants, as well as the operator's fingers from entering the access opening 10 at the front side of the housing and contacting the magnetic tape 3 therethrough. The contaminant problem is quite serious in the case of digital signal recording because the digital signals are recorded over much smaller lengths of the tape compared to the case of analog signal recording. In other words, digital signals have a higher recording density than analog signals so that it is even more important to take appropriate measures to prevent contaminants, such as fingerprints, from contacting the magnetic tape 3 in the case of recording digital signals.

The protective cover 9 is preferably formed of suitable synthetic resin material and has an elongated planar main portion 90 for covering the run of the tape 3 exposed along the length of the access opening 10 at the front side of the cassette housing 100. A pair of arm portions 91 and 92 extend substantially perpendicularly from the main portion 90 at its opposite ends. A pair of pivot or stub shafts 93 and 94 are provided within the interior of the cassette housing and pass through respective arm portions 91 and 92 of the protective cover 9. The pivot shafts 93 and 94 are colinearly aligned along a pivot axis around which the protective cover 9 pivots in either circumferential direction. The stub shafts 93 and 94 of the protective cover 9 are pivotally mounted to pairs of side end walls 30, 31, 32 and 33 of casings 1 and 2 in the front side corners of housing 100 through a pair of relatively large triangularly-shaped pivot holes 34 and 35 which are defined by pairs of triangular notches formed by cutting out abutting portions of the side end walls 30–33 of the upper and lower casings 1 and 2. Substantial clearance is provided for each of the stub shafts 93 and 94 in respective pivot holes 34 and 35 so that the shafts 93 and 94 can freely move in their respective pivot holes both in the circumferential direction around the pivot axis defined by the stub shafts 93 and 94 as well as in either transverse direction, i.e., toward and away from the front side of housing 100.

Figure 6:
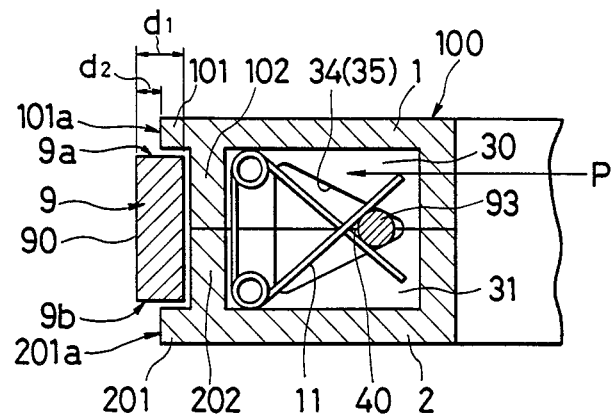
FIG. 6 is an enlarged fragmentary longitudinal sectional view taken along line VI—VI of FIG. 4.

A pair of double-armed triangularly-shaped springs 11 bias the protective cover 9 towards housing 100. As seen in FIG. 6, each of the springs 11 comprises an intermediate base portion and a pair of crossed free arm portions 40 connected to the opposite ends of the base portion via looped coils. The base portion of each of the springs 11 is urged against the front end walls 102 and 202 and the upper and lower walls of the upper and lower casings 1 and 2, and the outer crossed free arm portions 40 resiliently bias the respective stub shafts 93 and 94 which pass through the triangular pivot holes 34 and 35 rearwardly thereby urging the protective cover 9 rearwardly to contact the front side of housing 100 to cover the access opening 10 when the cover is in the first position. Thus, the springs 11 control the position of pivot shafts 93 and 94 of cover 9 to thereby define the first and second positions of cover 9.

It will be understood that other means may be used for urging the protective cover 9 rearwardly then the triangularly-shaped springs 11 illustrated in the preferred embodiment. For example, leaf springs comprising a thin metal plate, such as stainless steel or phosphor bronze, may be used for biasing the stub shafts 93 and 94 in a rearward direction.

Still referring to FIGS. 4–7, a pair of upper and lower stop projections 101 and 201 project forwardly from the upper and lower walls of the upper and lower casings 1 and 2 to which the protective cover 9 is pivotally mounted. The stop projections 101 and 201 project forwardly beyond the front end wall 102;202 of the cassette housing and the protective cover 9 is situated between the upper and lower stop projections 101 and 201 in contact with the front end wall 102;202 of the cassette housing when the cover is in its first, tape-covering position.

Figure 4:
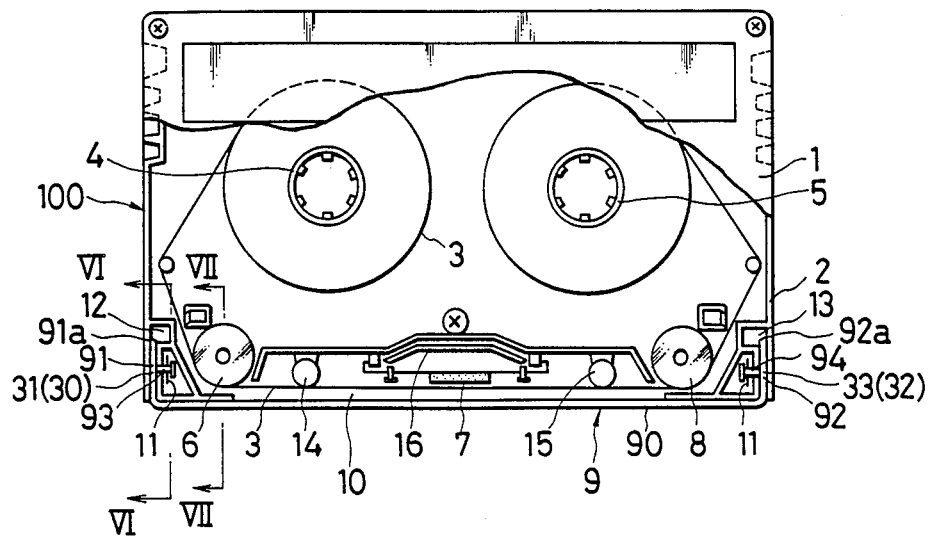
FIG. 4 is a top plan view, partially broken away, of a conventional magnetic tape cassette in accordance with the prior art.
Figure 5:
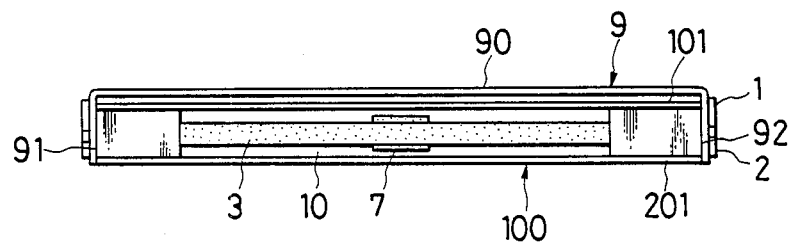
FIG. 5 is a front view of the cassette illustrated in FIG. 4 with the protective cover in its in-use position.

As seen in FIG. 4, a pair of positioning openings 12 and 13 through which a pair of positioning pins of a recording/playback apparatus, such as a cassette tape recorder, are inserted for positioning the tape cassette when the cassette is inserted into the apparatus preparatory to use are arranged at the left and right front side end portions of the upper and lower casings 1 and 2 and pass through the upper and lower surfaces thereof in the direction of thickness of the cassette housing. A pair of holes 14 and 15 are provided at the front side portions of the housing 100 through which a capstan drive shaft and a pinch roller shaft are received when the cassette housing is inserted into the recording/playback apparatus. A shield plate 16 is disposed in the middle of the front side portion of the cassette housing 100 at the rear of the tape pad 7.

When the tape cassette is not in use, as shown in FIG. 4, the protective cover 9 is urged by springs 11 into contact with the front side of the housing 100 and thus completely covers the access opening 10 at the front side of the housing to protect the magnetic tape 3 exposed at the access opening 10 to thereby eliminate any possibility that the operator's fingers and contaminants, such as dust and dirt, will enter into the cassette through the access opening 10 thereof to contact the magnetic tape 3 thereby preventing decreased performance of the magnetic tape or other more serious consequences.

Figure 7:
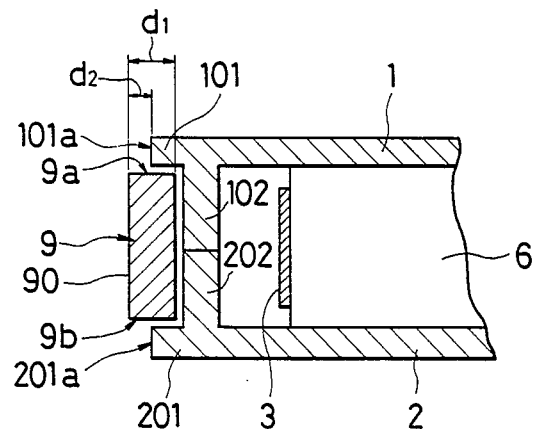
FIG. 7 is an enlarged fragmentary longitudinal sectional view taken along line VII—VII of FIG. 4.

Further, when the cassette is not in use as shown in FIG. 6 and 7, since the cover 9 is fitted between the stop projections 101 and 201, pivoting of the cover 9 is prevented by the upper and lower end faces 9a and 9b of the cover engaging the stop projections 101 and 201. In other words, the stop projections 101 and 201 function as a locking mechanism for preventing the protective cover 9 from pivoting when the cassette is not in use. When the protective cover 9 is in the first, tape-covering position, the free ends 91a and 92a of the arm portions 91 and 92 of cover 9 partly enter into the positioning openings 12 and 13, respectively.

When the cassette is to be used, it is inserted into a slot of the cassette tape recorder and the positioning pins of the recorder are inserted into the positioning openings 12 and 13 to thereby push the free ends 91a and 92a of arm portions 91 and 92 forwardly against the biasing forces of springs 11 as shown by arrow P in FIG. 6. This results in the cover 9 being moved forwardly away from the front end wall 102;202 of housing 100. Subsequently, the cover 9 is pivoted upwardly or downwardly through a 90° angle by a push pin of the cassette tape recorder to the second position shown in FIG. 5 thereby exposing the magnetic tape 3 at the access opening 10 at the front side of the housing 100.

Referring to FIGS. 6 and 7, the protective cover 9 has a thickness $d_1$ of a certain minimum value in order to ensure its mechanical strength. However, when the cover 9 is positioned between the stop projections 101 and 201 in the first, tape-covering position, the front edges of the upper and lower end faces 9a and 9b of the main portion 90, which has a rectangular cross-section, project forwardly beyond the end faces 101a and 201a of stop projections 101 and 201 by a distance $d_2$. This results in a problem when a certain force is applied to the front edge of the upper or lower end face 9a or 9b of the main portion 90 of cover 9 during handling. For example, when an inadvertent force is so applied, such as by the operator, the protective cover 9 can be relatively easily pivoted out of the first, tape-covering position and moved to a position wherein the magnetic tape 3 is exposed at the access opening 10 at the front side of the housing 100. This exposes the magnetic tape to contaminants, such as dust, dirt and operator's fingerprints.

The invention is directed to overcoming this problem and will be described in conjunction with FIGS. 1–3 wherein like reference numerals are used to designate identical or corresponding parts to the conventional tape cassette described above in conjunction with FIGS. 4–7. It is understood that the construction and operation of the conventional components of the tape cassette in accordance with the invention are similar to those described above in conjunction with the prior art tape cassette shown in FIGS. 4–7 and a detailed description of these components is therefore omitted for the sake of brevity.

Referring to FIG. 1, a protective cover 39 is pivotally mounted to cassette housing 100 with its elongated planar main portion situated between upper and lower stop projections 101 and 201 which extend forwardly from the upper and lower walls of upper and lower casings 1 and 2. The protective cover 39 contacts the front end wall 102; 202 of the cassette housing 100 when the cover 39 is in the first, tape-covering position. In the embodiment illustrated in FIG. 1, a pair of inclined flat and smooth surfaces 39c and 39d are formed in the upper and lower front edge corner portions of the elongated main portion 39f of cover 39 over its entire length. The inclined flat surfaces 39c and 39d intersect the upper and lower surfaces 39a and 39b of the main portion 39f of cover 39 at points that are substantially aligned with the planes containing the front surfaces 101a and 201a of the stop projections 101 and 201 and incline downwardly and upwardly, respectively, in the forward direction.

In this embodiment, since the upper and lower front edge corner portions of the main portion of the cover 39, normally present in the case of the conventional construction illustrated in FIGS. 4–7, are removed, the upper and lower surfaces 39a and 39b of the main portion 39f of cover 39 cannot be engaged or contacted by an operator's fingers and, therefore, the cover 39 cannot be readily pivoted manually.

The inclined flat surfaces 39c and 39d formed on the elongated main portion 39f of protective cover 39 thereby constitute smooth surface means which prevent the cover from pivoting from the first tape-covering position to the second in-use position when a force is applied to the main portion against the resilient biasing force applied to the protective cover by the springs 11. A force applied to either of the inclined surfaces 39c and 39d will have a component which acts to urge the elongated main portion 39f against the front end wall 102;202 of the cassette housing 100 to thereby retain the protective cover 39 between the stop projections 101 and 201 to prevent inadvertent pivoting thereof from the first, tape-covering position.

Figure 2:
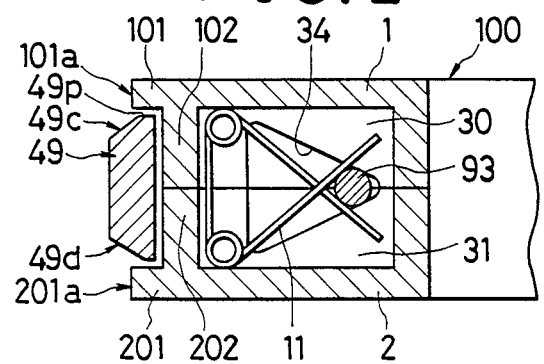
FIG. 2 is a fragmentary longitudinal sectional view, similar to FIG. 1, of another embodiment of a magnetic tape cassette in accordance with the present invention.

Referring to FIG. 2, another embodiment of a magnetic tape cassette in accordance with the present invention is illustrated. In this embodiment, a pair of inclined flat, smooth surfaces 49c and 49d are formed in the upper and lower front edge corner portions of the elongated main portion of a protective cover 49. Each of the inclined flat surfaces 49c and 49d intersect the upper and lower surfaces of the main cover portion at points 49p which are spaced inwardly or rearwardly of the planes of the front surfaces 101a and 201a of the stop projections 101 and 201 of cassette casings 1 and 2. Thus, the inclined surfaces 49c and 49d constitute smooth surface means which prevent the cover from pivoting out of the first tape-covering position in the same manner as described above in connection with FIG. 1.

In the first and second embodiments shown in FIGS. 1 and 2, the angle of inclination of the inclined smooth surfaces 39c, 39d, 49c and 49d are suitably selected and may comprise combinations of continuous inclined surfaces having different respective angles of inclination.

Figure 3:
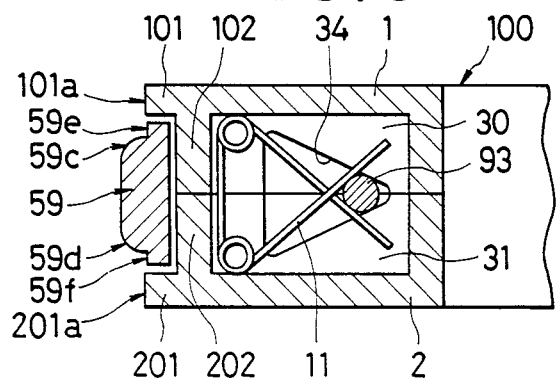
FIG. 3 is a fragmentary longitudinal sectional view, similar to FIG. 1, of a third embodiment of a magnetic tape cassette in accordance with the present invention.

Referring to FIG. 3, another embodiment of a magnetic tape cassette in accordance with the invention is illustrated. In this embodiment, the smooth surface means comprise a pair of rounded convex surfaces 59c and 59d and flat surfaces 59e and 59f, the latter extending substantially parallel to the front end wall 102;202 of the cassette housing. Thus, the smooth surface means 59c, 59d, 59e, 59f are formed in the main portion of the protective cover 59. In this case, the same advantages and effects are obtained as in the case of the embodiments described above in connection with FIGS. 1 and 2. According to the invention, the smooth surface means may also comprise rounded convex surfaces alone.

It will be understood from the above-described embodiments of the invention that since the smooth surfaces are formed in the upper and lower front edge corner portions of the main elongated planar portion of the cover, the upper and lower surfaces of the main portion of the cover cannot be engaged or struck by an operator's fingers, i.e., forces cannot be applied to the upper and lower surfaces of the main portion of the cover when the cover is positioned in the first, tape-covering position, which will cause pivoting of the protective cover out of the first, tape-covering position. Therefore, inadvertent pivoting or opening of the protective cover by the operator, or through other handling steps, is prevented, and consequently contaminant problems, such contact between the magnetic tape and contaminants such as fingerprints, dust or dirt, are prevented by the invention.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A magnetic tape cassette, comprising
a housing having walls portions defining an interior and a front side provided with a tape access opening,
means for mounting magnetic tape in said housing interior for travel past said tape access opening so that a run of the tape is exposed at said access opening,
a protective cover pivotally mounted to said housing at said front side thereof for movement between a first, tape-covering position at which said protective cover overlies said access opening to protect the magnetic tape exposed at said access opening and a second, in-use position at which said protective cover is remote from said access opening so that a run of said tape which is exposed at said access opening is not protected, and
biasing means arranged in said housing for urging said protective cover in a biasing direction towards said front side of said housing when said protective cover is in said first position,
wherein said cassette housing comprises top and bottom walls and respective stop projections extending forwardly from said top and bottom walls, said protective cover being situated between said stop projections when positioned in said first tape-covering position, and
said protective cover comprises
an elongated planar main portion extending along said front side of said housing in said first position,
a pair of arm portions connected to opposite end portions of said planar main portion extending substantially perpendicularly therefrom, and
a pair of flat and smooth surfaces formed on opposite upper and lower front edge corner portions of said elongated main portion and inclined with respect to a plane extending along said front side of said housing,
wherein said inclined surfaces are positioned upon said protective cover such that any force normal to said biasing directions that is applied to either of said inclined surfaces in said first position will be broken up to generate a force component which acts to urge said elongated main portion of said protective cover in said biasing direction towards said front side of said housing, and thereby retaining said protective cover between said stop projections in said first position,
wherein said protective cover additionally comprises upper and lower end faces positioned adjacent and inwardly of said respective stop projections when said cover is in said first position, with said inclined flat surfaces intersecting said upper and lower end faces at points substantially aligned with front surface planes with respective stop projections and inclining forwardly and upwardly or downwardly therefrom, or said inclined flat surfaces intersecting said upper and lower end faces at points spaced inwardly or rearwardly of said front surface planes of said respective stop projections and inclining forwardly and upwardly or downwardly therefrom,
whereby, when said cover is in said first position, force cannot be applied to said front edge corner portions of said protective cover which would cause pivoting of said cover out of said first, tape-covering position.

2. The combination of claim 1, wherein said protective cover is mounted upon said housing for initial forward movement away from said front side of said housing against biasing action of said biasing means and then pivotal upward or downward movement as the same is moved from said first position to said second position.

3. A magnetic tape cassette, comprising
a housing having wall portions defining an interior and a front side provided with a tape access opening,
means for mounting magnetic tape in said housing interior for travel past said tape access opening so that a run of the tape is exposed at said access opening,
a protective cover pivotally mounted to said housing at said front side thereof for movement between a first, tape-covering position at which said protective cover overlies said access opening to protect the magnetic tape exposed at said access opening and a second, in-use position at which said protective cover is remote from said access opening so that a run of said tape which is exposed at said access opening is not protected, and biasing means arranged in said housing for urging said protective cover in a biasing direction towards said front side of said housing when said protective cover is in said first position, wherein said cassette housing comprises top and bottom walls and respective stop projections extending forwardly from said top and bottom walls, said protective cover being situated between said stop projections when positioned in said first tape-covering position, and said protective cover comprises an elongated planar main portion extending along said front side of said housing in said first position, a pair of arm projections connected to opposite end portions of said planar main portion and extending substantially perpendicularly therefrom, and a pair of rounded, convex surfaces formed on opposite upper and lower front edge corner portions of said elongated main portion, wherein said protective cover additionally comprises a pair of flat surfaces formed on said opposite front edge portions of said protective cover, and extending upwardly or downwardly from said respective rounded surfaces, said flat surfaces extending substantially parallel to front surface planes of said respective stop projections, when said cover is in said first position, and wherein said rounded surfaces are positioned upon said protective cover such that any force normal to said biasing direction that is applied to either of said rounded surfaces in said first position will be broken up to generate a force component which acts to urge said elongated main portion of said protective cover in said biasing direction towards said front side of said housing, and thereby retaining said protective cover between said stop projections in said first position, whereby, when said cover is in said first position, force cannot be applied to said front edge corner portions of said protective cover which would cause pivoting of said cover out of said first, tape-covering position.

4. The combination of claim 3, wherein said protective cover is mounted upon said housing for initial forward movement away from said front side of said housing against biasing action of said biasing means and then pivotal upward or downward movement as the same is moved from said first position to said second position.

* * * * *